United States Patent
Gao

(10) Patent No.: US 11,094,977 B2
(45) Date of Patent: Aug. 17, 2021

(54) BATTERY THERMAL MANAGEMENT SYSTEM WITH PASSIVE BATTERY PACK COOLING

(71) Applicant: Baidu USA LLC, Sunnyvale, CA (US)

(72) Inventor: Tianyi Gao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 168 days.

(21) Appl. No.: 16/557,764

(22) Filed: Aug. 30, 2019

(65) Prior Publication Data

US 2021/0066768 A1  Mar. 4, 2021

(51) Int. Cl.
| | | |
|---|---|---|
| H01M 10/50 | (2006.01) | |
| H01M 10/613 | (2014.01) | |
| H01M 10/653 | (2014.01) | |
| H01M 10/6557 | (2014.01) | |
| H01M 10/6567 | (2014.01) | |
| H01M 10/659 | (2014.01) | |
| H01M 10/658 | (2014.01) | |
| H01M 50/24 | (2021.01) | |
| H01M 10/052 | (2010.01) | |
| H01M 50/20 | (2021.01) | |

(52) U.S. Cl.
CPC ....... *H01M 10/613* (2015.04); *H01M 10/653* (2015.04); *H01M 10/658* (2015.04); *H01M 10/659* (2015.04); *H01M 10/6557* (2015.04); *H01M 10/6567* (2015.04); *H01M 50/24* (2021.01); *H01M 10/052* (2013.01); *H01M 50/20* (2021.01); *H01M 2220/20* (2013.01)

(58) Field of Classification Search
CPC .. H01M 10/617; H01M 10/61; H01M 10/613; H01M 10/615; H01M 10/653; H01M 10/6559; H01M 10/6557; H01M 10/6567; H01M 10/658; H01M 10/659; H01M 50/24; H01M 50/20; H01M 10/052; H01M 2220/20
See application file for complete search history.

(56) References Cited

U.S. PATENT DOCUMENTS

| | | | |
|---|---|---|---|
| 10,847,771 B2 * | 11/2020 | Goitsuka | H01M 50/20 |
| 2017/0005381 A1 * | 1/2017 | Harris | H01M 50/116 |
| 2018/0254536 A1 * | 9/2018 | Chidester | H01M 10/6556 |
| 2020/0335744 A1 * | 10/2020 | Tucker | H01M 10/6568 |

* cited by examiner

*Primary Examiner* — Raymond Alejandro
(74) *Attorney, Agent, or Firm* — Womble Bond Dickinson (US) LLP

(57) ABSTRACT

According to one embodiment, a battery module includes an output connector, several battery cells that are coupled to the output connector and are at least partially submerged within a liquid coolant. The battery cells are configured to provide battery energy to a load via the output connector and are configured to draw power from an external power supply to charge the battery cells via the output connector. While the battery cells provide the battery energy or draw power, the battery cells generate heat that is transferred into the liquid coolant, thereby causing at least some of the liquid coolant to turn into vapor extracting the heat. The battery module also includes a condenser that is positioned above the battery cells and is configured to condense the vapor back into liquid coolant.

21 Claims, 7 Drawing Sheets

BATTERY THERMAL MANAGEMENT SYSTEM WITH PASSIVE BATTERY PACK COOLING

FIELD

Embodiments of the present disclosure relate generally to a battery thermal management system that passively cools battery packs. More particularly, embodiments of the disclosure relate to a battery thermal management system that utilizes phase change of fluid to cool a battery pack.

BACKGROUND

Lithium-ion batteries are commonly used in the vehicle industry, for example, electric vehicles (EVs) and plug-in hybrids. Lithium-ion battery packs for electric vehicles are designed for vehicle specific requirements and usage. Lithium-ion batteries, however, are also becoming popular for IT equipment and data center as an energy storage unit that is replacing UPS systems and attracting much attention from the industry.

Large clusters of computer servers can be kept in dedicated facilities, often in a rack enclosure. The servers can be used in support of the data center industry. Use of a battery backup unit (BBU) in place of traditional solutions, such as lead-acid based Uninterruptible Power Supply (UPS) systems, has grown in popularity. One result of the BBU's new role in the data center space is the relocation of the BBU from a centralized battery room to a data center IT room. Thermal environment (e.g., temperature) in the data center is generally managed and operated based on specifications and requirements of the servers, not batteries and therefore may not be optimized for BBU use.

In contrast, in the case of a BBU, the battery provides power only when backup power is needed (e.g., there is a power outage to the data center). When backup power is no longer needed (e.g., grid power is restored to the data center), the BBU is recharged. Thus, a unique problem in the BBU application is that thermal management or cooling will be active only during limited times: e.g., discharging during a power outage and charging after power is restored. Therefore, a battery thermal management system is needed that self-activates during times at which the batteries charge and discharge in order to ensure that the batteries do not over heat.

In addition, a self-activating thermal management system should be fast enough to avoid thermal overshoot, which can negatively impact battery performance and battery lifetime, and evenly cool cells. Conventional battery thermal management systems used in the data center industry primarily use air cooling. These systems, however, may not evenly cool battery cells, which could result in at least some thermal overshoot. Therefore, there is a need for a self-activating thermal management system that evenly cools batteries in order to maintain battery performance.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
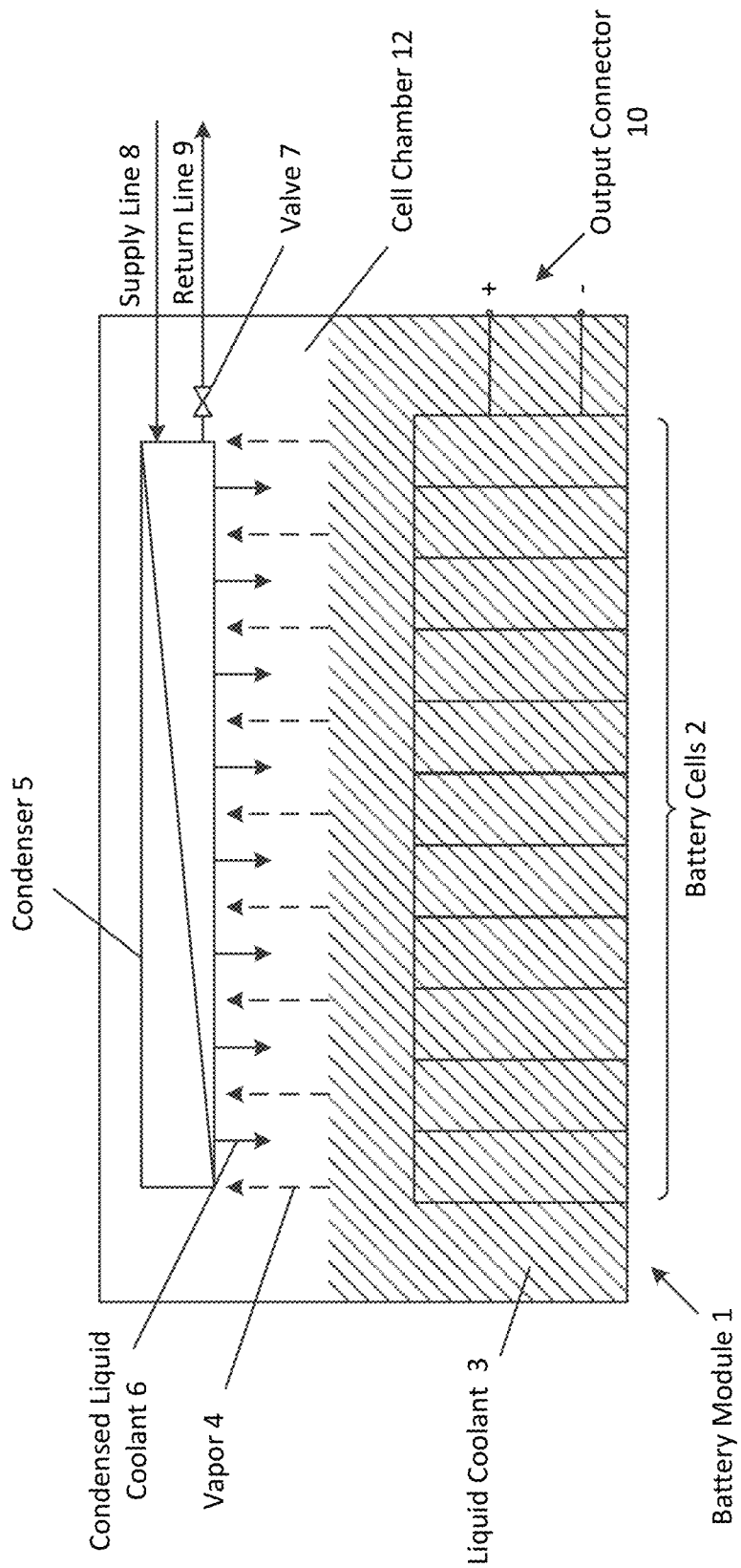
FIG. 1 is a block diagram illustrating an example of a battery module according to one embodiment.

Several embodiments of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of the each range's endpoints.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one embodiment, a battery module includes an output connector, several battery cells that are coupled to the output connector and are at least partially submerged within a liquid coolant, and a condenser that is positioned above the battery cells. The battery cells are configured to provide battery energy to a load via the output connector and are configured to draw power from an external power supply to charge the battery cells via the connector. While the battery cells provide the battery energy or draw power, the battery cells generate heat that is transferred into the liquid coolant, thereby causing at least some of the liquid coolant to turn into a vapor. The condenser is configured to condense the vapor back into liquid coolant.

In one embodiment, the battery module includes a supply line and a return line that are both coupled to the condenser and an external cooling unit to create a heat exchanging loop for air-to-liquid heat exchange. The supply line is configured to supply cooling fluid to the condenser and the return line is configured to receiving the cooling fluid from the condenser. The battery module may also include a valve that is coupled between the supply line and the condenser or coupled between the return line and the condenser, and is configured to allow the cooling fluid to flow through the heat exchanging loop when the batter cells provide the battery energy or draw power. In one embodiment the battery module includes a supply connector is coupled to the supply line and a return connector is coupled to the supply line, where both connectors enable the battery module to be removable coupled to the lines.

In some embodiments, the battery cells, the liquid coolant, and the condenser are sealed within a container. In other embodiments, the container and the valve are enclosed within an exterior enclosure.

In one embodiment the battery module includes a pressure sensor that is configured to detect changes in pressure within the battery module, where the valve is configured to allow the cooling fluid to flow based on the changes in pressure. In another embodiment, the battery module includes a temperature sensor that is configured to detect changes in temperature of the liquid coolant, where the valve is configured to allow the cooling fluid to flow based on the changes in temperature. In some embodiments, the battery module includes a filling port, a draining port, and a liquid level sensor that is configured to detect changes in a level of liquid coolant within the battery module. In response to the level of the liquid cooling being below a threshold, the filing port is configured to allow liquid to fill the battery module. On the other hand, in response to the level of the liquid coolant being above the threshold, the draining port is configured to drain liquid coolant from the battery module.

According to another embodiment, a battery backup unit (BBU) that is configured to provide backup power includes a set of one or more battery modules, each of which may be similar to the battery module as previously described. In one embodiment, the battery module (and/or BBU) further includes a cooling unit that is separate from the battery module, where the cooling unit is a liquid-to-air heat exchanger or a liquid-to-liquid heat exchanger.

According to one embodiment, an electronic rack includes several server blades arranged in a stack, each server blade including one or more servers to provide data processing services, a power supply coupled to the server blades to provide power to operate the servers, and a BBU coupled to the server blades to provide backup power to the servers when the power supply is unable to provide power. The BBU includes a set of battery modules, each battery module is similar to the battery module as previously described. In one embodiment, the BBU is configured to connect to a cooling fluid distribution manifold that is coupled to an external cooling unit to create a heat exchanging loop for liquid-to-liquid heat exchange. In another embodiment, the cooling fluid distribution manifold includes a supply path and a return path, where each battery module's condenser is coupled to the cooling fluid distribution manifold and is part of the heat exchanging loop to allow cooling fluid to flow from the supply path, through the condenser, and back into the return path.

In one embodiment, a cooling system or a battery thermal management system for a battery module can addressed specific needs of backup power provided by a BBU in support of IT racks in a data center or IT room environment. As described, conditions and requirements of a BBU in an IT rack, data center, and/or IT room environment are different from conditions and requirements of a battery module in an electrical vehicle application. For example, thermal environments are different, and the discharging and charging cycles occur much less in the data center application scenario than in the electrical vehicle application.

Cooling systems for batteries can be critical because nominal battery performance is typically specified for working temperatures ranges of battery cells (e.g., 25° C. to 35° C.). Temperature also plays an important role with respect to battery aging. Temperatures outside of the working range may result in reduced performance and negatively impact battery health. In addition, when multiple battery cells are connected, there can be large internal differences between different cell temperatures due to multiple factors, such as cell arrangement and cooling condition variations, which can lead to different charge and discharge rates for each cell and deteriorate performance of the battery module. Importantly, if battery temperature exceeds safety thermal limits, this can cause extreme damage or harm, even catastrophic results. Thus, thermal management of battery systems are important features to consider in the design and operation of a battery because it impacts how a battery performs, the health and lifetime of the batter, and safety.

A battery thermal management system for a BBU can be self-activating by utilising phase change natural convection heat transfer. In one embodiment, the thermal management system includes a battery module that includes 1) an output connector, 2) several battery cells that are coupled to the output connector and are at least partially submerged within a liquid coolant, and 3) a condenser. The battery cells and the condenser may be located within a cell chamber (or evaporation chamber) of the battery module, where the condenser is positioned above the battery cells.

When the cells charge or discharge, thermal energy generated by one or more of the battery cells is absorbed by (or transferred into) the liquid coolant, causing the coolant to change from liquid to vapor and rise (or travel) upward towards and into the condenser, where the condenser condenses the vapor, thereby causing the vapor to change back to liquid coolant. Specifically, the condenser is coupled to a supply line and a return line, which are coupled to an external cooling unit (e.g., a liquid-to-liquid heat exchanger) to create a heat exchanging loop for air-to-liquid heat exchange of the vapor back into the liquid coolant. Once condensed, the condensed liquid coolant drops (e.g., as droplets) and returns to the cell chamber in order to be combined with liquid coolant that is still within the chamber.

In such a manner, the battery module uses natural convection to automatically and passively manage heat generated by the battery module (e.g., the battery cells contained within the battery module) by changing fluid phases, circulating fluid, and transferring thermal energy away from the battery cells only when they get hot. Specifically, heat is transferred using natural convection (fluid is circulated within and away from the condenser), while the vapor coolant and liquid coolant remain fully contained within the battery module. This not only improves cooling performance, but also reduces the possibility of having vapor and/or liquid coolant leak out of the battery module (e.g., during transit to a data center or during operation in an electronic rack), since the whole process is performed from within the module (e.g., without having the vapor travel to an external condenser).

It should be mentioned that the phrase "battery pack" may be used herein interchangeably with "battery backup unit (BBU)" and with "BBU pack". Also, a BBU pack may include one or more battery modules (or battery systems). A battery module may include several battery cells. Other features are also described in the following examples.

FIG. 1 shows a block diagram illustrating an example of a battery module according to one embodiment. Specifically, this figure shows a battery module 1 that includes several battery cells 2, liquid coolant 3, a condenser 5, a supply line 8, a return line 9, an output connector 10, and a valve 7. In one embodiment, the battery module 1 may have any shape and configuration. For example, as illustrated, the battery module 1 is a rectangular box. In other embodiments, however, the battery module 1 may be a square or a cylinder. In some embodiments, the battery module may include one battery cell, or may include two or more battery cells that are series connected, parallel connected, or a combination. The battery cells may be of any type, such as Lithium-ion, Nickel Cadmium, etc. The output connector 10 (one anode and one cathode) of the battery module 1 are configured to couple to a load (e.g., the load may be at least one server) in order for the battery module to provide battery energy stored within the cells to the load, and is configured to couple to a power supply (or source) to charge the battery cells in the module. In one embodiment, the output connector 10 are configured to be removeably coupled to connectors (not shown) of the load in order to allow the battery module 1 to be removed and/or added (in series or in parallel) to the load.

The liquid coolant 3 may be any type of liquid (or fluid), such as dielectric liquid. In one embodiment, the liquid coolant 3 may be a single liquid or a combination of two or more liquids. In one embodiment, the coolant may be non-toxic, environmentally-friendly dielectric heat transfer fluid. In another embodiment, the coolant may have a boiling point that enables the coolant to change phase (e.g., into a gas or vapor) based on battery cell thermal requirements. Specifically, the coolant may have a boiling point below (or at) a discharging (and/or charging) temperature threshold of the battery cells (e.g., a temperature between 45° C. to 70° C.).

The condenser 5 may be any type of condenser that is configured to receive (or obtain) gas or vapor, and extract and transfer thermal energy away from the vapor, thereby turning the vapor back to a liquid. Although the condenser is illustrated as a rectangular box, in one embodiment the condenser may be any shape and configuration. In one embodiment, although not illustrated, the condenser may include one or more first openings that allows vapor to enter a condenser chamber that includes a condenser coil. During operation, the condenser coil condenses the vapor back to the liquid that is then dispensed back into the cell chamber 12 through one or more second openings (which may be the same or different than the first openings). In one embodiment, the condenser 5 may be a condenser coil. The condenser coil may be any type of coil, such as spiral tubes, straight tubes, etc. More about the operation of the condenser 5 is described herein.

Coupled to the condenser 5 is a supply line 8 that is configured to supply cooling fluid to the condenser (e.g., that will flow through the condensing coil) and a return line 9 that is configured to receiving the cooling fluid from the condenser. In one embodiment, the cooling fluid that is supplied by the supply line 8 is at a lower temperature than the cooling fluid that is received by the return line 9. In one embodiment, both lines are coupled to the condenser at one end and coupled to an external cooling unit (e.g., a unit that is separate from the battery module 1) at another end. The coupling of the cooling unit (e.g., unit 25 illustrated in FIG. 2) to the battery module 1 via lines 8 and 9 create a heat exchanging loop for air-to-liquid heat exchange. In one embodiment, the supply line 8 and return line 9 may be composed of any material. For instance, the lines may be composed of metal, such as copper, a polymer (e.g., a rubber), and/or plastic. In one embodiment, the lines may be composed of a flexible material, such as rubber. In another embodiment, one line (e.g., the supply line) may be composed of a different material than the other line (e.g., the return line).

As illustrated, the valve 7 is coupled between the condenser 5 and the return line 9. In one embodiment, the valve may be coupled directly to the condenser 5, where the return line 9 couples to the condenser via the valve. In another embodiment, the valve may be coupled between the condenser 5 and the supply line 8. In some embodiments, the battery module 1 may include more than one valve. The valve is configured to allow cooling fluid to flow through the heat exchanging loop (e.g., from and to the cooling unit) in order to enable the condenser to condense vapor into liquid. In one embodiment, the valve is configured to allow the cooling fluid to flow when the battery cells are discharging (e.g., providing battery energy to a load) and/or charging (e.g., drawing power from a power source).

In one embodiment, the battery module illustrated in this figure provides a thermal management solution that utilizes a phase change of coolant to passively transfer heat generated by the battery cells 2 in order to manage an operational temperature of the cells. Specifically, during operation (e.g., discharging and/or charging), the battery cells 2 will produce heat that is transferred to the liquid coolant 3. The temperature of the coolant may achieve (or meet) a boiling point, thereby causing some of the coolant to change phase into a vapor 4 (illustrated as dashed arrows). The valve is opened in order to allow cooling fluid to flow through the condenser. The vapor is condensed by the condenser 5 into condensed liquid coolant 6, which flows downward toward and combined with the liquid coolant 3 in the cell chamber at a lower temperature. This cycle may repeat while (and after) operation of the battery cells in order to maintain a thermal (e.g., equilibrium) environment within the battery pack.

Figure 2:
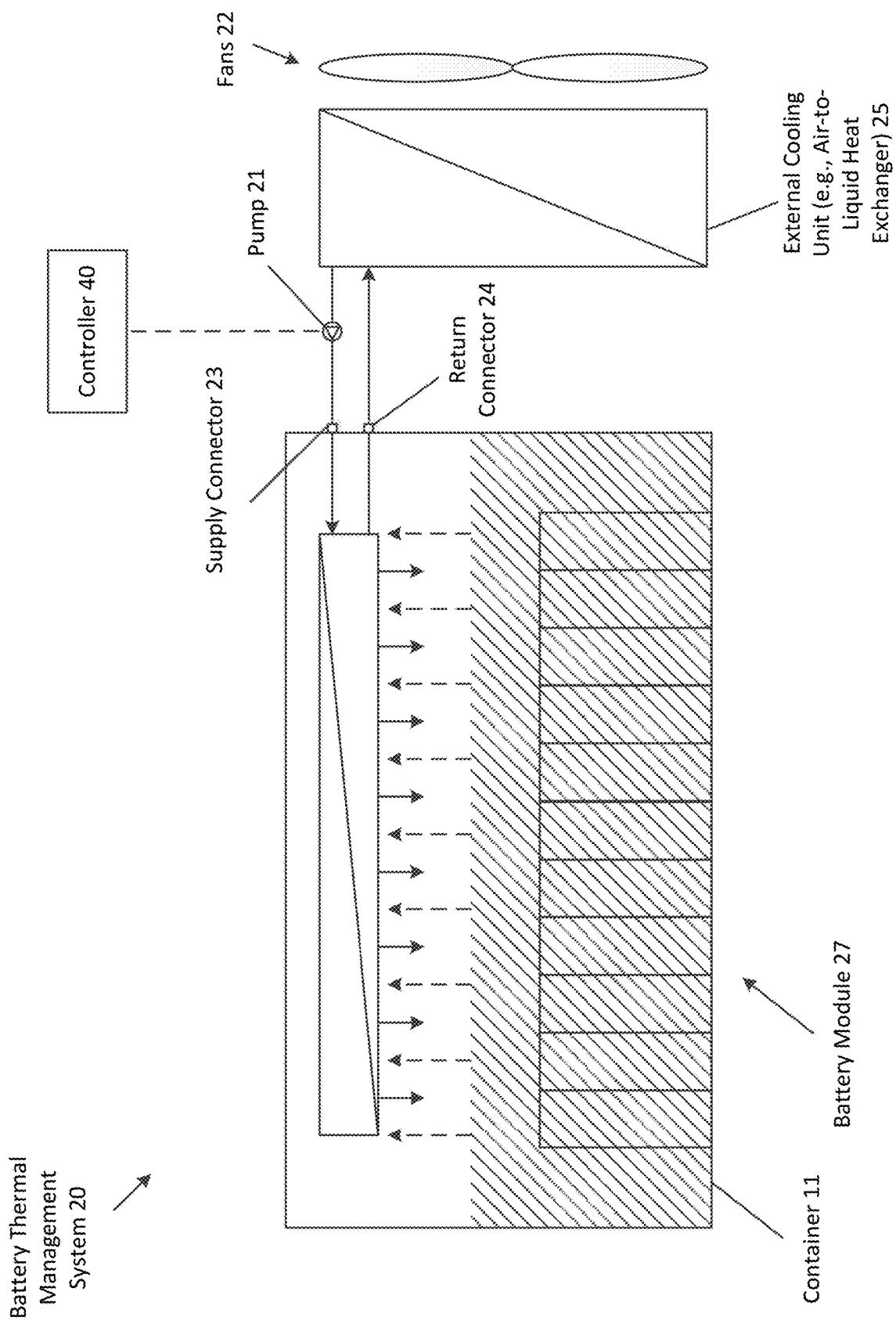
FIG. 2 is a block diagram illustrating an example of a battery thermal management system that includes a battery module, a pump, an external cooling unit, and a controller according to one embodiment.

FIG. 2 is a block diagram illustrating an example of a battery thermal management system 20 that includes a battery module 27, a pump 21, an external cooling unit 25, a controller 40, and one or more fans 22. In one embodiment, the battery thermal management system 20 (or a portion thereof) may be a part of at least one BBU, as described herein. In some embodiments, a BBU may include more or less elements of the system 20. For example, one BBU may include two or more battery modules that are coupled (via separate supply and return lines) to one external cooling unit (which may or may not be a part of the BBU). In one embodiment, any of the battery modules described herein may be a part of a BBU.

In this example, the battery module 27 includes a supply connector 23 that is coupled to the condenser (e.g., via an internal supply line) and is removeably coupled to the supply line 8, and a return connector 24 that is coupled to the condenser (e.g., via an internal return line) and is removeably coupled to the return line 9. Both connectors enable the battery module to be disconnected from the supply and return lines in order to remove the battery module from the heat exchanging loop, and enable the battery module to be connected to the supply and return lines in order to create a heat-exchanging loop. In one embodiment, the connectors may be any type of connectors, such as quick-connect fittings that allow for easy connection/removal of the respective lines.

Since the battery module may be removed from a heat-exchanging loop, the module may be a self-contained unit. Specifically, the module may include a container 11 in which the battery cells, the liquid coolant, and the condenser are sealed within. Sealing the battery module ensures that any vapor 4 and/or liquid coolant 3 remains contained therein, thereby preventing or reducing any potential leaks. In one embodiment, the sealed battery module may include at least one valve and/or pump, as described herein.

As illustrated, the pump 21 is coupled between the supply line and the external cooling unit 25, and is configured to push cooling fluid through the heat-exchanging loop. Specifically, the pump may be any type of mechanical pump that pushes cooling fluid into the supply line in order to circulate the fluid through the system. In one embodiment, the system 20 may include more than one pump. In another embodiment, pump may be coupled between the return line and the external cooling unit 25, and is configured to push cooling fluid into the unit 25. Similar to valve 7 of FIG. 1, the pump may be configured to pump (or push) fluid when the battery cells are discharging and/or charging. Specifically, the pump may be controlled to push fluid based on certain criteria. More about controlling the pump is described herein.

In this example, the pump 21 is located outside of the battery module in order to allow a user access to the pump without needing to open the battery module (e.g., when the module is sealed to prevent access). The user may need to access the pump requires maintenance or needs to be replaced. As a result, the pump may be removeably coupled to the supply line (or the return line) and be removeably coupled from the external cooling unit 25. In another embodiment, similar to the example of FIG. 1, the pump 21 may be contained within the battery module.

The external cooling unit 25 may be any type of cooling unit that is configured to extract thermal energy from the cooling fluid. As illustrated, the unit 25 may be an air-to-liquid heat exchanger that has one or more fans 22 that are used to disperse heat. In one embodiment, the unit 25 may be any type of heat exchanger, such as a liquid-to-liquid heat exchanger. In another embodiment, the battery module may be coupled to a separate coolant distribution manifold that is coupled to one or more external cooling units, as described herein.

The controller 40 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). In one embodiment, the controller may be a circuit with a combination of analog elements (e.g., resistors, capacitors, inductors, etc.) and/or digital elements (e.g., logic-based elements, such as transistors, etc.). The controller may also include memory. In one embodiment, the controller may be a part of the battery module (e.g., contained within the module or coupled to the outside of the module), or may be communicatively coupled to a BBU pack that includes the module (e.g., may be a part of circuitry of a BBU pack or of an electronic rack that is holding the BBU pack).

In one embodiment, the controller 40 is configured to control the valve (e.g., by transmitting a control signal to control circuitry of the valve, such as an electronic switch) in order to activate the heat-exchanging loop. Specifically, the controller may monitor certain criteria to determine whether cooling fluid should circulate throughout the system. For example, the controller may determine whether current is flowing from (or into) the battery cells (e.g., based on a current sense), which may indicate that the cells are in operation (e.g., discharging and/or charging). Upon making the determination, the controller causes the valve to open. More about how the controller causes cooling fluid to circulate throughout the system is described herein.

Figure 3:
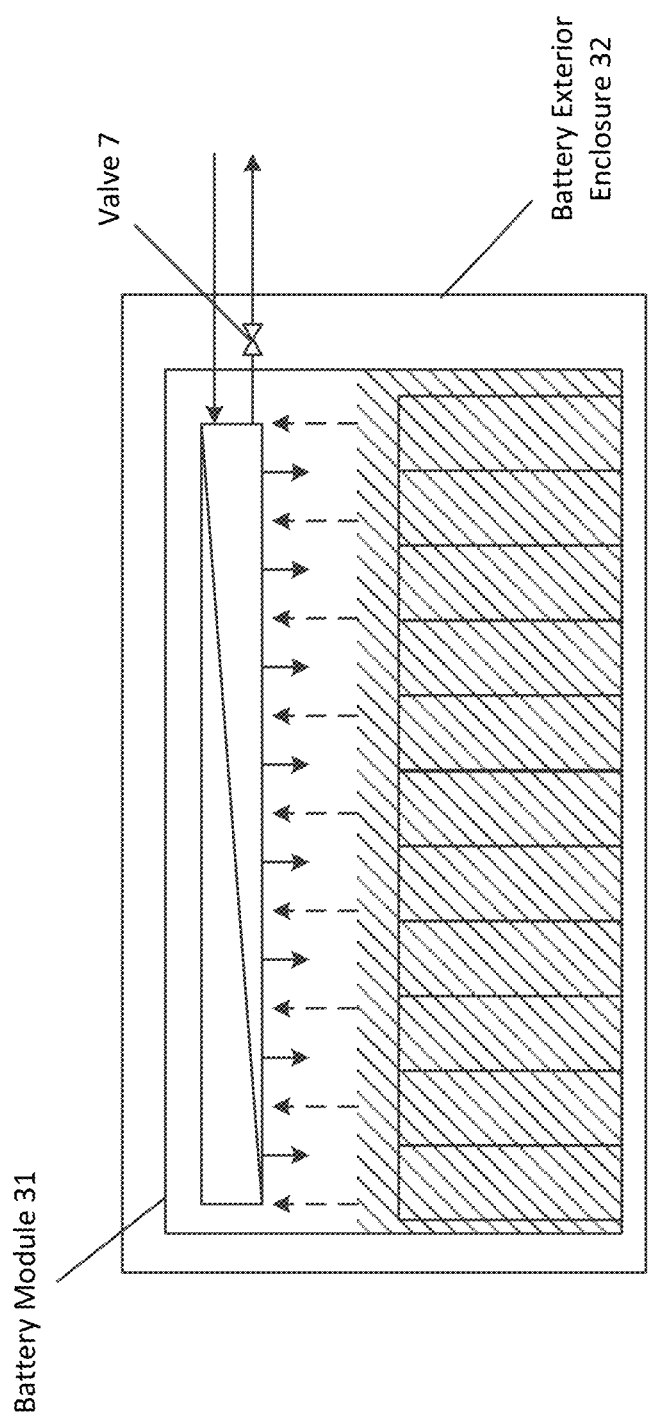
FIG. 3 is a block diagram illustrating an example of a battery module with an exterior enclosure according to one embodiment.

FIG. 3 is a block diagram illustrating an example of a battery module with an exterior enclosure according to one embodiment. Specifically, this example illustrates a battery module 31 and the valve 7 are inside a (battery) exterior enclosure 32. Not having the valve in the battery module may have several advantages. For example, by removing the valve, a size of the battery module 31 may be reduced as compared to the battery module 1 of FIG. 1. As a result, less liquid coolant 3 may need to be used in order to cool the cells. As another example, since the valve 7 is a moving part (because it is configured to open/close), it may be prone to failure. As a result, by having it separate from the battery module 31, a user may perform maintenance upon the valve and/or replace the valve when needed, while having the battery module 31 remain sealed. As yet another example, placing the battery module 31 inside a separate enclosure 32 may prevent any liquid (and/or vapor) that may leak out of the entire BBU pack from coming into contact with other electronics (e.g., servers on a server rack). In one embodiment, the battery exterior enclosure 32 may include connectors (e.g., quick-connect fittings) on 1) the outside of the enclosure that are coupled to respective supply and/or return lines that couple the enclosure to a cooling unit and/or 2) the inside of the enclosure that are coupled to respective supply and/or return lines that couple the enclosure to the battery module. In one embodiment, in addition to (or in lieu of) a valve 7, pump 21 may be inside the battery exterior enclosure 32.

Figure 4:
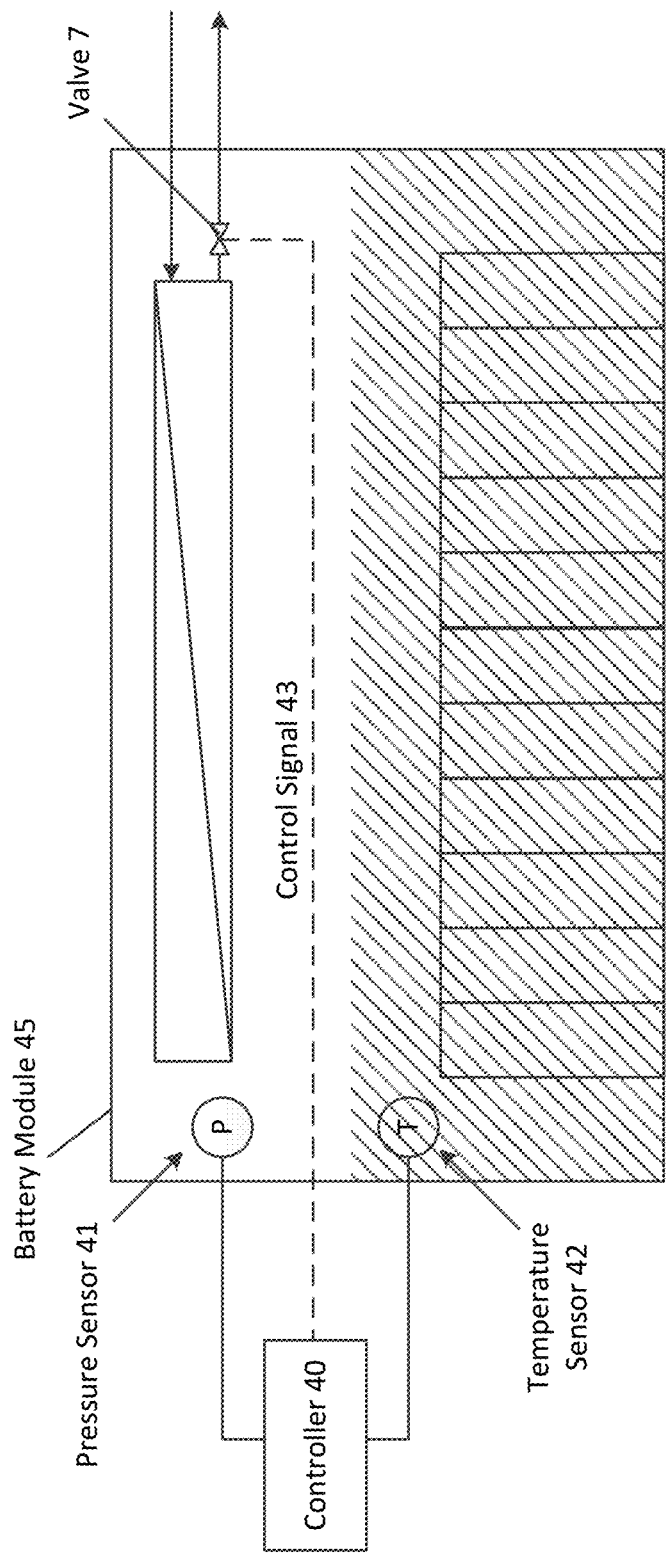
FIG. 4 is a block diagram illustrating an example of a battery module according to another embodiment.

As described herein, the present disclosure describes a self-activating battery thermal management system that activates a heat-exchanging loop (e.g., enables cooling fluid to flow through the loop). In one embodiment, the system 20 may activate during operation of the battery module (e.g., discharging and/or charging of the battery cells). To enable the flow of the cooling fluid, the system 20 may control at least one valve (e.g., valve 7) and/or at least one pump (e.g., pump 21) that is within the loop to cause cooling fluid to flow. As described herein, the system may control these components based on certain criteria. For example, the system may enable (and/or adjust) the flow (or flow rate) of the cooling fluid based on temperature and/or pressure within the battery module. FIG. 4 is a block diagram illustrating an example of such a system. Specifically, FIG. 4 shows the battery thermal management system that includes a battery module 45 and the controller 40.

In this figure, the battery module includes a temperature sensor 42 and a pressure sensor 41, each of which are electronically coupled (e.g., via a wired or wireless connection) to the controller 40. Also shown, the controller 40 is electronically coupled to the valve 7. The temperature sensor may be any type of sensor (e.g., a thermocouple, a resistance temperature detector (RTD), etc.) that is configured to detect (or sense) changes in temperature of the liquid coolant. Specifically, the sensor senses a temperature of the coolant and produces a corresponding electrical signal which represents (or indicates) a temperature (e.g., reading or value). In this example, the temperature sensor is located within the liquid coolant 3. In another embodiment, however, the temperature sensor may be positioned anywhere inside the battery module, or may be positioned outside and on the module. The pressure sensor 41 may be any type of sensor (e.g., a piezoelectric pressure sensor, a force collector type, a pressure transducer, etc.) that is configured to detect (or sense) changes in (air) pressure within the battery module. Specifically, the pressure sensor senses air pressure (within the cell chamber 12) in the battery module and produces a corresponding electrical signal that indicates the air pressure (e.g., reading or value) inside of the module. In this example, the pressure sensor is located above the liquid coolant 3. In another embodiment, however, the pressure sensor may be located anywhere within the cell chamber of the module.

The controller 40 is configured to obtain (or receive) signals from sensor 41 and/or sensor 42, and to control the valve 7 based on the obtained signals. Specifically, as the cells discharge/charge they generate heat that is absorbed by the liquid coolant, which in turn causes the temperature of the coolant to increase. The controller 40 monitors the temperature of the coolant (via the signal received from the sensor 42) and determines whether to open/close the valve 7 based on the temperature. For example, the controller 40 may determine whether the temperature exceeds a threshold temperature, or is within a temperature range. If so, the controller 40 transmits a control signal 43 to the valve 7, causing the valve to open in order to allow cooling fluid to flow through the heat-exchanging loop. Conversely, if the temperature is below the threshold temperature, the controller 40 transmits the control signal 43 to cause the valve to close. Similarly, the controller 40 may monitor the air pressure of the module in order to determine whether to open/close the valve 7. Specifically, since the module is a closed (or sealed) environment, the heat generated by the cells will increase the temperature of the module, thereby causing the air pressure inside the module to increase (e.g., PV=nRT, where P is pressure and T is temperature). Thus, the controller 40 may determine whether the pressure exceeds a pressure threshold, or is within a temperature range. If so, the controller 40 causes the valve to change opening ratio. Thus, the valve is configured to allow cooling fluid to flow based on changes in temperature and/or pressure. In some embodiments, when the system 20 includes pump 21, the controller 40 is configured to control the pump (e.g., adjust a speed at which the pump pushes fluid through the system) based on the temperature and/or pressure, as described herein. This control provides an optimal environment for the battery cells even though the BBU may dynamically change heat generation conditions (e.g., while discharging and while charging).

In one embodiment, the controller 40 is configured adjust the flow (or flow rate) of the cooling fluid (by adjusting a closed or open position of the valve) based on the temperature and/or pressure. For example, the controller 40 may cause the valve to open (e.g., half way) at a first temperature, and upon determining that the temperature has increased (e.g., to a higher second temperature) may cause the valve to open more (e.g., all the way).

Figure 5:
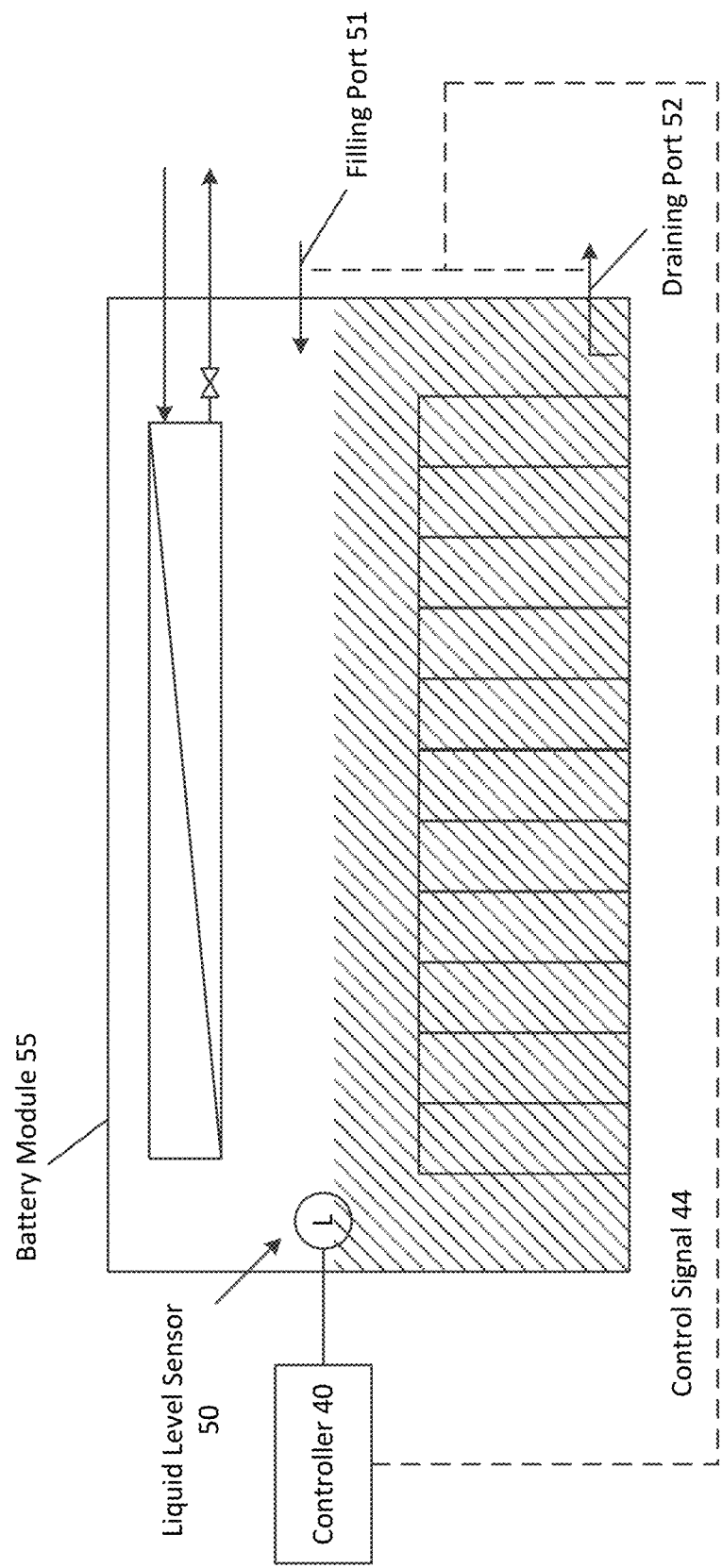
FIG. 5 is a block diagram illustrating an example of a battery module according to another embodiment.

FIG. 5 is a block diagram an example of a battery thermal management system according to another embodiment. In this figure, the battery module 55 includes a liquid level sensor 50, a filing port 51, and a draining port 52. Also shown, the controller 40 is electronically coupled to the sensor 40 and both ports. The level sensor 50 may be any type of sensor (e.g., a float switch, an ultrasonic level sensor, etc.) that is configured to detect changes in a level of liquid coolant within the battery module. Specifically, the sensor 50 senses a level of the liquid coolant and produces a corresponding electrical signal, which represents the level. The filling port 51 may be any port or valve that is configured to allow liquid to fill the battery module and the draining port 52 may be any port or valve that is configured to drawn liquid coolant from the module.

The controller 40 obtains the signal and determines whether the liquid coolant is too low or too high. For instance, the controller 40 may compare the level to a threshold level or a level threshold range. In response to the level of the liquid coolant being below the threshold (or a first threshold), the controller 40 transmits a control signal 44 to the filling port, causing the port to allow liquid coolant to flow through and into the module (e.g., by opening the port). Once the controller 40 determines that the level of coolant is at the threshold level, the controller 40 may transmit a control signal for the filling port to close. Similarly, in response to the level of the liquid coolant being above the threshold (or a second threshold that is higher than the first threshold), the controller 40 transmits a control signal 44 to the draining port, causing the port to drain liquid coolant from the module. In one embodiment, when the threshold is a range, the controller 40 may cause the filling port to fill the module when the level is below the range, and conversely the controller 40 may cause the draining port to drain the module when the level is above the range.

As described above, a BBU pack can be utilized as a backup power supply unit in an electronic rack of a data center. An electronic rack includes an array of server blades, each including a computer server for data processing. The electronic rack further includes a power supply to provide power to the server blades and a BBU pack to provide backup power to the server blades or other IT equipment when the power supply is unavailable.

Figure 6:
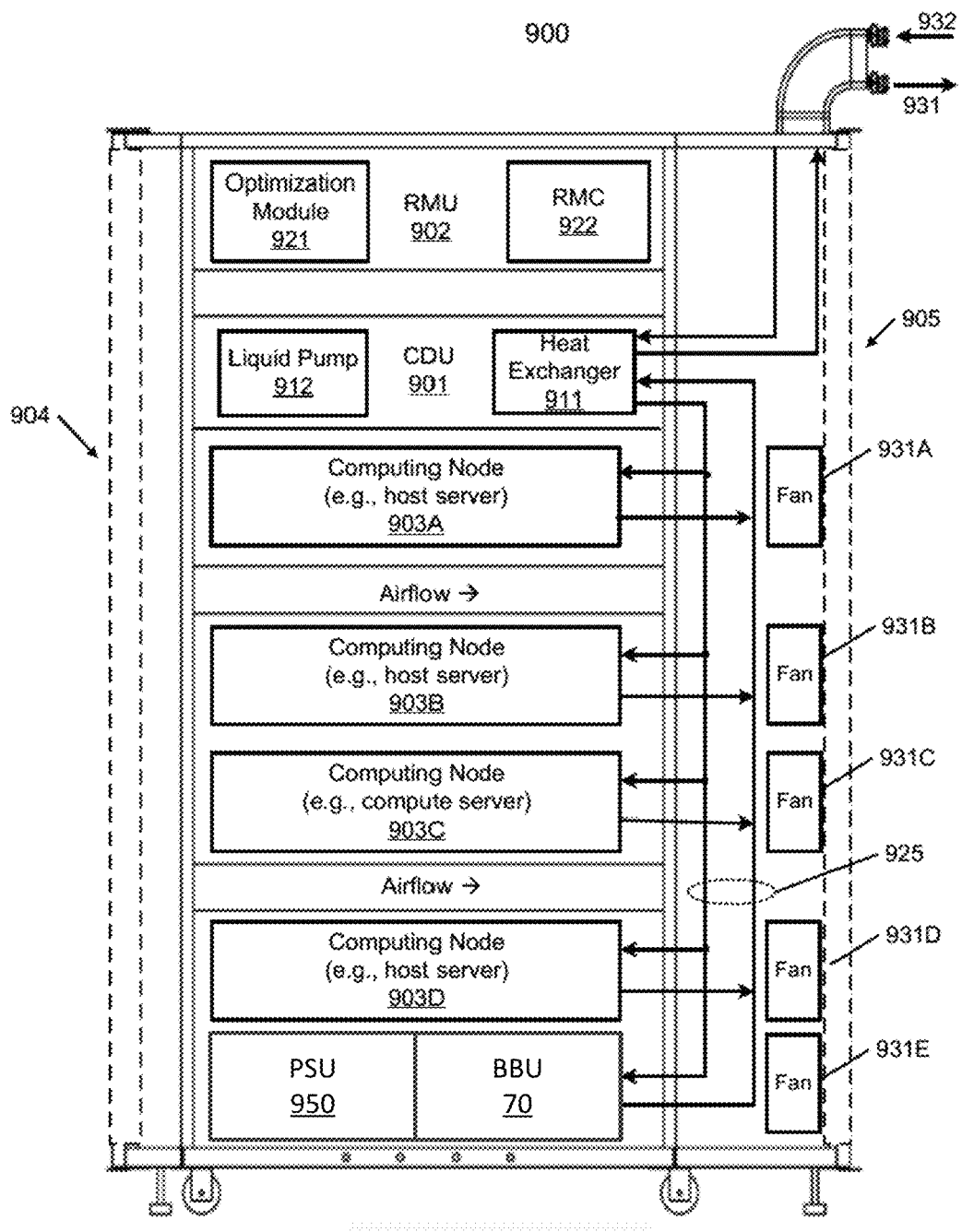
FIG. 6 shows an example of an electronic rack containing a battery backup unit (BBU) according to one embodiment.

FIG. 6 is a block diagram illustrating an example of an electronic rack according to one embodiment. Electronic rack 900 may include one or more server slots to contain one or more servers respectively. Each server includes one or more information technology (IT) components (e.g., processors, memory, storage devices, network interfaces). According to one embodiment, electronic rack 900 includes, but is not limited to, CDU 901, rack management unit (RMU) 902 (optional), a power supply unit (PSU) 950, the BBU 70 (which may include a battery thermal management system with any of the components as described herein, such as a battery module (which may include a valve), a controller, and/or a cooling unit), and one or more server blades 903A-903D (collectively referred to as server blades 903). Server blades 903 can be inserted into an array of server slots respectively from frontend 904 or backend 905 of electronic rack 900. The PSU 950 and/or BBU 70 may be inserted into any of server slots 903 within the electronic rack 900. In one embodiment, one or more BBUs may be inserted into any of server slots 903 within the electronic rack 900.

Note that although there are only four server blades 903A-903D shown here, more or fewer server blades may be maintained within electronic rack 900. Also note that the particular positions of CDU 901, RMU 902, PSU 950, BBU 70, and server blades 903 are shown for the purpose of illustration only; other arrangements or configurations of CDU 901, RMU 902, BBU 70, and server blades 903 may also be implemented. Note that electronic rack 900 can be either open to the environment or partially contained by a rack container, as long as the cooling fans can generate airflows from the frontend to the backend.

In addition, a fan module can be associated with each of the server blades 903, and the BBU 70. In this embodiment, fan modules 931A-931E, collectively referred to as fan modules 931, and are associated with server blades 903A-903D and BBS 1 respectively. Each of the fan modules 931 includes one or more cooling fans. Fan modules 931 may be mounted on the backends of server blades 903 and BBU 70 to generate airflows flowing from frontend 904, traveling through the air space of the sever blades 903, and existing at backend 905 of electronic rack 900. In one embodiment, each of the fan modules may be mounted on the backends of the server blades 903 and one or more BBU 70. BBU 70 may be any BBU described throughout this application.

In one embodiment, CDU 901 mainly includes heat exchanger 911, liquid pump 912, and a pump controller (not shown), and some other components such as a liquid reservoir, a power supply, monitoring sensors and so on. Heat exchanger 911 may be a liquid-to-liquid heat exchanger. Heat exchanger 911 includes a first loop with inlet and outlet ports having a first pair of liquid connectors coupled to external liquid supply/return lines 931-932 to form a primary loop. The connectors coupled to the external liquid supply/return lines 931-932 may be disposed or mounted on backend 905 of electronic rack 900. The liquid supply/return lines 931-932 are coupled to a set of room manifolds, which are coupled to an external heat removal system, or external cooling loop. In addition, heat exchanger 911 further includes a second loop with two ports having a second pair of liquid connectors coupled to liquid manifold 925 to form a secondary loop, which may include a supply manifold to supply cooling liquid to server blades 903 and a return manifold to return warmer liquid back to CDU 901. Note that CDUs 901 can be any kind of CDUs commercially available or customized ones. Thus, the details of CDUs 901 will not be described herein. As an example, the BBU 70 and/or the BBU 80 shown in FIG. 7 may connect to 925 to complete a full fluid loop.

Each of server blades 903 may include one or more IT components (e.g., central processing units or CPUs, graphical processing units (GPUs), memory, and/or storage devices). Each IT component may perform data processing tasks, where the IT component may include software installed in a storage device, loaded into the memory, and executed by one or more processors to perform the data processing tasks. At least some of these IT components may be attached to the bottom of any of the cooling devices as described above. Server blades 903 may include a host server (referred to as a host node) coupled to one or more compute servers (also referred to as computing nodes, such as CPU server and GPU server). The host server (having one or more CPUs) typically interfaces with clients over a network (e.g., Internet) to receive a request for a particular service such as storage services (e.g., cloud-based storage services such as backup and/or restoration), executing an application to perform certain operations (e.g., image processing, deep data learning algorithms or modeling, etc., as a part of a software-as-a-service or SaaS platform). In response to the request, the host server distributes the tasks to one or more of the performance computing nodes or compute servers (having one or more GPUs) managed by the host server. The performance compute servers perform the actual tasks, which may generate heat during the operations.

Electronic rack 900 further includes optional RMU 902 configured to provide and manage power supplied to servers 903, fan modules 931, and CDU 901. Optimization module 921 and RMC 922 can communicate with a controller in some of the applications. RMU 902 may be coupled to PSU 950 to manage the power consumption of the PSU. The PSU 950 may include the necessary circuitry (e.g., an alternating current (AC) to direct current (DC) or DC to DC power converter, backup battery, transformer, or regulator, etc.,) to provide power to the rest of the components of electronic rack 900.

In one embodiment, RMU 902 includes optimization module 921 and rack management controller (RMC) 922. RMC 922 may include a monitor to monitor operating status of various components within electronic rack 900, such as, for example, computing nodes 903, CDU 901, and fan modules 931. Specifically, the monitor receives operating data from various sensors representing the operating environments of electronic rack 900. For example, the monitor may receive operating data representing temperatures of the processors, cooling liquid, and airflows, which may be captured and collected via various temperature sensors. The monitor may also receive data representing the fan power and pump power generated by the fan modules 931 and liquid pump 912, which may be proportional to their respective speeds. These operating data are referred to as real-time operating data. Note that the monitor may be implemented as a separate module within RMU 902.

Based on the operating data, optimization module 921 performs an optimization using a predetermined optimization function or optimization model to derive a set of optimal fan speeds for fan modules 931 and an optimal pump speed for liquid pump 912, such that the total power consumption of liquid pump 912 and fan modules 931 reaches minimum, while the operating data associated with liquid pump 912 and cooling fans of fan modules 931 are within their respective designed specifications. Once the optimal pump speed and optimal fan speeds have been determined, RMC 922 configures liquid pump 912 and cooling fans of fan modules 931 based on the optimal pump speed and fan speeds.

As an example, based on the optimal pump speed, RMC 922 communicates with a pump controller of CDU 901 to control the speed of liquid pump 912, which in turn controls a liquid flow rate of cooling liquid supplied to the liquid manifold 925 to be distributed to at least some of server blades 903. Therefore, the operating condition and the corresponding cooling device performance are adjusted. Similarly, based on the optimal fan speeds, RMC 922 communicates with each of the fan modules 931 to control the speed of each cooling fan of the fan modules 931, which in turn control the airflow rates of the fan modules 931. Note that each of fan modules 931 may be individually controlled with its specific optimal fan speed, and different fan modules and/or different cooling fans within the same fan module may have different optimal fan speeds.

Note that some or all of the IT components of servers 903 (e.g., 903A, 903B, 903C, and/or 903D) may be attached to any one of the cooling devices described above, either via air cooling using a heatsink or via liquid cooling using a cold plate. One server may utilize air cooling while another server may utilize liquid cooling. Alternatively, one IT component of a server may utilize air cooling while another IT component of the same server may utilize liquid cooling. In addition, a switch is not shown here, which can be either air cooled or liquid cooled. In one embodiment, the locations of the equipment or components of the electronic rack, such as the PSU and BBU may be varied, and may not be exactly as shown in this Figure.

Figure 7:
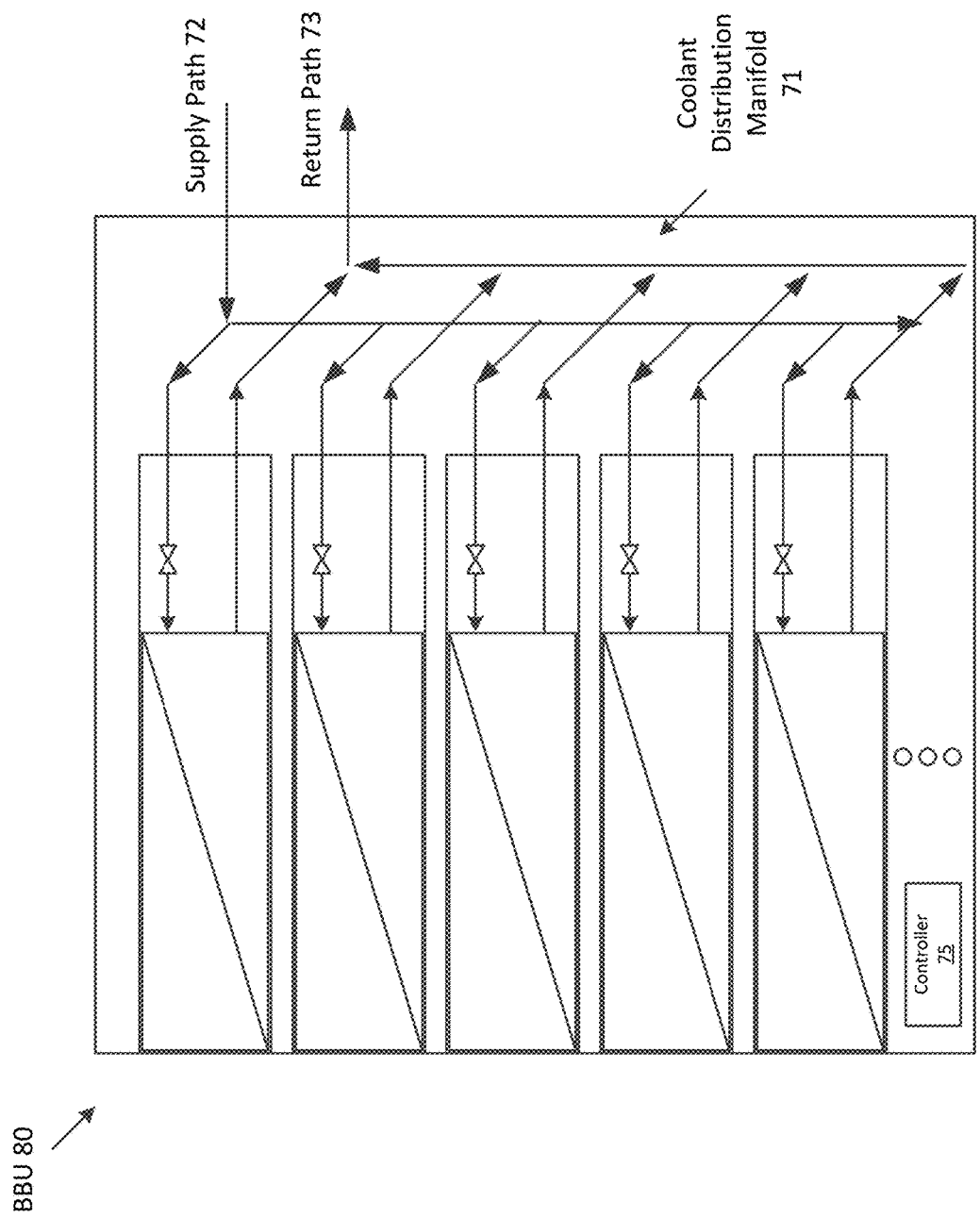
FIG. 7 shows an example of a BBU with several battery modules according to one embodiment.

FIG. 7 is an example of a BBU with several battery modules according to one embodiment. This figure shows BBU 80 that includes five battery modules (e.g., battery module 1) and a coolant distribution manifold 71. In one embodiment, the distribution manifold 71 is coupled to heat exchanger 911 via manifold 925 to create a heat-exchanging loop for air-to-liquid heat exchange, as describe herein. Specifically, a supply line of each of the modules is coupled to a supply path 72 of the manifold 71 and a return line of each of the modules is coupled to a return path 73 of the manifold 71 in order for the modules to be a part of the heat exchanging loop. Each of the paths may be coupled to a corresponding path (or line) of the manifold 925 in order to allow coolant from the heat exchanger 911 to circulate through each of the battery modules. In one embodiment, the distribution manifold 71 may be coupled to one or more heat exchangers.

In some embodiments, rather than (or in addition to) having a coolant distribution manifold 71, the battery modules of the BBU may (e.g., directly) connect to the liquid manifold 925 of the electronic rack.

The controller 75 is configured to activate at least some of the heat-exchanging loops within the battery modules (e.g., by controlling a valve integrated therein). Specifically, the controller may perform similar operations as described herein with respect to controller 40. In one embodiment, however, each of the battery modules may include a controller that is configured to control the loop as described herein.

In another embodiment, one of the battery modules within the BBU 80 may include less components as illustrated herein. For example, a battery module may not include a cooling unit. Instead, a valve (or pump) within the battery module may allow coolant from the primary loop to circulate, as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

As previously explained, an embodiment of the disclosure may be (or include) a non-transitory machine-readable medium (such as microelectronic memory) having stored thereon instructions, which program one or more data processing components (generically referred to here as a "processor") to perform battery thermal management operations, such as controlling valves and/or pumps based on temperature/pressure of a battery pack (or BBU pack). In other embodiments, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A battery module comprising
an output connector;
a plurality of battery cells that are coupled to the output connector and are at least partially submerged within a liquid coolant, wherein the plurality of battery cells are configured to provide battery energy to a load via the output connector and are configured to draw power from an external power supply to charge the battery cells via the output connector, wherein, while the plurality of battery cells provide the battery energy or draw power, the battery cells generate heat that is transferred into the liquid coolant thereby causing at least some of the liquid coolant to turn into a vapor; and
a condenser that is positioned above the plurality of battery cells and is configured to condense the vapor back into liquid coolant.

2. The battery module of claim 1 further comprising
a supply line and a return line that are both coupled to the condenser and an external cooling unit to create a heat exchanging loop for air-to-liquid heat exchange, wherein the supply line is configured to supply cooling fluid to the condenser and the return line is configured to receive the cooling fluid from the condenser; and
a valve that is coupled between the supply line and the condenser or coupled between the return line and the condenser, and is configured to allow the cooling fluid to flow through the heat exchanging loop when the plurality of battery cells provide the battery energy or draw power.

3. The battery module of claim 2, wherein the plurality of battery cells, the liquid coolant, and the condenser are sealed within a container.

4. The battery module of claim 3, wherein the container and the valve are enclosed within an exterior enclosure.

5. The battery module of claim 2 further comprising a pressure sensor that is configured to detect changes in pressure within the battery module, wherein the valve is configured to allow the cooling fluid to flow based on the changes in pressure.

6. The battery module of claim 2 further comprising a temperature sensor that is configured to detect changes in temperature of the liquid coolant, wherein the valve is configured to allow the cooling fluid to flow based on the changes in temperature.

7. The battery module of claim 2 further comprises a supply connector that is coupled to the supply line and a return connector that is coupled to the return line, wherein the supply and return connectors are configured to removably couple to corresponding external supply and return lines that are coupled to an external cooling unit.

8. The battery module of claim 1 further comprising
a filling port;
a draining port; and
a liquid level sensor that is configured to detect changes in a level of liquid coolant within the battery module, wherein,
in response to the level of the liquid coolant being below a threshold, the filling port is configured to allow liquid coolant to fill the battery module, and
in response to the level of the liquid coolant being above the threshold, the draining port is configured to drain liquid coolant from the battery module.

9. A battery backup unit (BBU) to provide backup power, the BBU comprising:
a set of one or more battery modules, wherein each of the battery modules includes an output connector,
a plurality of battery cells that are coupled to the output connector and are at least partially submerged within a liquid coolant, wherein the plurality of battery cells are configured to provide battery energy to a load via the output connector and are configured to draw power form an external power supply to charge the battery cells via the output connector, and a condenser that is positioned above the plurality of cells, wherein, while the plurality of battery cells provide the battery energy or draw power, the cells generate heat that is transferred into the liquid coolant thereby causing at least some of the liquid coolant to turn into a vapor, and the condenser condenses the vapor back into liquid coolant.

10. The BBU of claim 9, wherein the battery module further comprises:

a cooling unit that is separate from the battery module; and a supply line and a return line that are both coupled to the condenser and coupled to the cooling unit, thereby creating a heat exchanging loop for air-to-liquid heat exchange, wherein the supply line is configured to supply cooling fluid from the unit to the condenser, and the return line is configured to receive the cooling fluid from the condenser to the unit.

11. The BBU of claim 10, wherein the battery module further comprises at least one of a valve that is coupled between the supply line and the condenser or is coupled between the return line and the condenser, and is configured to allow the cooling fluid to flow through the heat exchanging loop; and a pump that is coupled between the supply line and the cooling unit or coupled between the return line and the cooling unit, and is configured to push the cooling fluid through the heat exchanging loop.

12. The BBU of claim 11, wherein the battery module comprises a temperature sensor that is configured to detect changes in temperature of the liquid coolant, wherein the valve is configured to allow the cooling fluid to flow and the pump is configured to push the cooling fluid based on the changes in temperature.

13. The BBU of claim 11, wherein the battery module comprises a pressure sensor that is configured to detect changes in pressure within the battery module, wherein the value is configured to allow the cooling fluid to flow and the pump is configured to push the cooling fluid based on changes in pressure.

14. The BBU of claim 11, wherein the plurality of battery cells, the liquid coolant, and the condenser are sealed within a container.

15. The BBU of claim 14, wherein the battery module further comprises a valve that is configured to allow cooling fluid to flow through the condenser, wherein the container and the valve are enclosed within an exterior enclosure.

16. The BBU of claim 10, wherein the cooling unit is an air-to-liquid heat exchanger or a liquid-to-liquid heat exchanger.

17. The BBU of claim 10, wherein the battery module comprises a supply connector that is removeably coupled to the supply line and a return connector that is removeably coupled to the return line.

18. The BBU of claim 9, wherein the battery module further comprises:

a filling port;

a draining port; and a liquid level sensor that is configured to detect changes in a level of the liquid coolant within the battery module, wherein, in response to the level of the liquid coolant being below a threshold, the filling port is configured to allow liquid to fill the battery module, and in response to the level of the liquid coolant being above the threshold, the draining port is configured to drain the liquid coolant from the battery module.

19. An electronic rack comprising:

a plurality of server blades arranged in a stack, each server blade including one or more servers to provide data processing services;

a power supply coupled to the server blades to provide power to operate the servers; and a battery backup unit (BBU) coupled to the server blades to provide backup power to the servers when the power supply is unable to provide power, wherein the BBU comprises a set of battery modules, wherein each battery module comprises a plurality of battery cells that are at least partially submerged within a liquid coolant and are configured to allow the BBU to draw battery energy to provide the backup power and are configured to draw power form an external power supply to charge the battery cells, and a condenser that is positioned above the plurality of battery cells; and wherein, while the BBU draws the battery energy or while the battery cells draw power from the external power supply, for each battery module the cells generate heat that is transferred into the liquid coolant that causes at least some of the liquid coolant to turn into a vapor, and the condenser condenses the vapor back into liquid coolant.

20. The electronic rack of claim 19, wherein the BBU is configured to connect to a coolant distribution manifold that is coupled to an external cooling unit to create a heat exchanging loop for air-to-liquid heat exchange.

21. The electronic rack of claim 20, wherein the coolant fluid distribution manifold comprises a supply path and a return path, wherein a condenser of each battery module is coupled to the coolant fluid distribution manifold and is a part of the heat exchanging loop to allow cooling fluid to flow from the supply path, through the condenser, and back into the return path.

* * * * *